(12) United States Patent
Zhao et al.

(10) Patent No.: US 11,343,443 B2
(45) Date of Patent: *May 24, 2022

(54) UNMANNED AERIAL VEHICLE AND MULTI-OCULAR IMAGING SYSTEM

(71) Applicant: SZ DJI TECHNOLOGY CO., LTD., Shenzhen (CN)

(72) Inventors: Cong Zhao, Shenzhen (CN); Guyue Zhou, Shenzhen (CN); Honghui Zhang, Shenzhen (CN); Yin Tang, Shenzhen (CN); Guisheng Nong, Shenzhen (CN); Jiangang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,582

(22) Filed: Jun. 2, 2020

(65) Prior Publication Data

US 2020/0296300 A1 Sep. 17, 2020

Related U.S. Application Data

(63) Continuation of application No. 16/046,116, filed on Jul. 26, 2018, now Pat. No. 10,681,285, which is a (Continued)

(51) Int. Cl.
*H04N 5/247* (2006.01)
*B64B 1/00* (2006.01)
(Continued)

(52) U.S. Cl.
CPC ............... *H04N 5/247* (2013.01); *B64B 1/00* (2013.01); *B64C 25/12* (2013.01); *B64C 25/52* (2013.01); *B64C 39/024* (2013.01); *B64D 47/08* (2013.01); *H04N 5/2252* (2013.01); *H04N 5/2253* (2013.01); *H04N 5/2257* (2013.01);
(Continued)

(58) Field of Classification Search
CPC ............ H04N 5/247; B64C 25/12; B64B 1/00
See application file for complete search history.

(56) References Cited

U.S. PATENT DOCUMENTS

| 9,571,819 | B1 | 2/2017 | Barron | |
|---|---|---|---|---|
| 2003/0150956 | A1* | 8/2003 | Salmon | B64C 1/22 244/120 |

(Continued)

FOREIGN PATENT DOCUMENTS

| CN | 101504287 A | 8/2009 |
|---|---|---|
| CN | 102806990 A | 12/2012 |

(Continued)

OTHER PUBLICATIONS

Translation of CN 204750554 U Peng, Unmanned aerial vehicle damping system, 2015, CN patent publisher.

(Continued)

*Primary Examiner* — Zhubing Ren
(74) *Attorney, Agent, or Firm* — Anova Law Group, PLLC

(57) ABSTRACT

An unmanned aerial vehicle (UAV) includes a vehicle body and a multi-ocular imaging assembly. The multi-ocular imaging assembly includes at least two imaging devices disposed in and fixed to the vehicle body.

19 Claims, 7 Drawing Sheets

Related U.S. Application Data continuation of application No. PCT/CN2016/072217, filed on Jan. 26, 2016.

(51) Int. Cl.
| | |
|---|---|
| *H04N 5/225* | (2006.01) |
| *H04N 7/18* | (2006.01) |
| *B64C 25/12* | (2006.01) |
| *B64C 25/52* | (2006.01) |
| *B64C 39/02* | (2006.01) |
| *B64D 47/08* | (2006.01) |

(52) U.S. Cl.
CPC ........... *H04N 5/2258* (2013.01); *H04N 7/181* (2013.01); *H04N 7/185* (2013.01); *B64C 2201/127* (2013.01)

(56) References Cited

U.S. PATENT DOCUMENTS

| | | | | |
|---|---|---|---|---|
| 2008/0143832 | A1* | 6/2008 | Bramoulle | G08B 13/196 348/144 |
| 2009/0294573 | A1* | 12/2009 | Wilson | B64D 5/00 244/2 |
| 2010/0013927 | A1* | 1/2010 | Nixon | B64G 1/1021 348/144 |
| 2012/0044710 | A1* | 2/2012 | Jones | B64C 39/024 362/470 |
| 2012/0179308 | A1* | 7/2012 | Peters | G05D 1/0858 701/13 |
| 2013/0111993 | A1* | 5/2013 | Wang | F16F 15/022 73/514.01 |
| 2013/0314502 | A1* | 11/2013 | Urbach | H04N 7/181 348/46 |
| 2014/0312165 | A1 | 10/2014 | Mkrtchyan | |
| 2014/0368378 | A1 | 12/2014 | Crain et al. | |
| 2016/0309341 | A1 | 10/2016 | Prest et al. | |
| 2017/0251193 | A1* | 8/2017 | Zhou | G01C 11/06 |

FOREIGN PATENT DOCUMENTS

| | | |
|---|---|---|
| CN | 102914294 A | 2/2013 |
| CN | 203318680 U | 12/2013 |
| CN | 203612208 U | 5/2014 |
| CN | 204236781 U | 4/2015 |
| CN | 204297114 U | 4/2015 |
| CN | 105015767 A | 11/2015 |
| CN | 105035299 A | 11/2015 |
| CN | 105035312 A | 11/2015 |
| CN | 204750554 U | 11/2015 |
| CN | 204776028 U | 11/2015 |
| CN | 105222760 A | 1/2016 |
| JP | H0943753 A | 2/1997 |
| KR | 20010104929 A | 11/2001 |

OTHER PUBLICATIONS

Translation of CN-101504287-A; Jiang, Posture parameter evaluation method for unmanned aerial vehicle, 2009, CN patent publisher.

The World Intellectual Property Organization (WIPO) International Search Report and Written Opinion for PCT/CN2016/072217 (Translation) dated Oct. 24, 2016.

* cited by examiner

UNMANNED AERIAL VEHICLE AND MULTI-OCULAR IMAGING SYSTEM

CROSS-REFERENCE TO RELATED APPLICATION

This application is a continuation of U.S. patent application Ser. No. 16/046,116, filed on Jul. 26, 2018, which claims priority to International Application No. PCT/CN2016/072217, filed on Jan. 26, 2016, the entire contents of all of which are incorporated herein by reference.

TECHNICAL FIELD

The present disclosure relates to the unmanned aerial vehicle (UAV) field and, more particularly, to a UAV and a multi-ocular imaging system.

BACKGROUND OF THE DISCLOSURE

Unmanned aerial vehicles (UAVs) have been used in aerial photography, surveillance, exploration and rescue. UAVs can carry sensing cameras to implement obstacle avoidance, velocity measurement, positioning and navigation. Sensing cameras can sense a surrounding environment of the UAV and an attitude of the UAV. A plurality of sensing cameras can be provided on the UAV to obtain depth information of the surrounding environment. The plurality of sensing cameras are also known as a multi-ocular imaging assembly.

Existing multi-ocular module is provided to an exterior of a UAV vehicle body via a connection component. However, the multi-ocular imaging assembly is subject to a non-rigid body vibration, resulting in a decreased reliability of the obtained information.

SUMMARY OF THE DISCLOSURE

In accordance with the disclosure, there is provided an unmanned aerial vehicle (UAV) including a vehicle body and a multi-ocular imaging assembly. The multi-ocular imaging assembly includes at least two imaging devices disposed in and fixed to the vehicle body.

Also in accordance with the disclosure, there is provided a multi-ocular imaging system including an unmanned aerial vehicle (UAV) and a multi-ocular imaging assembly carried by the UAV. The UAV includes a vehicle body. The multi-ocular imaging assembly includes at least two imaging devices provided in and fixed to the vehicle body.

LIST OF REFERENCE NUMERALS

TABLE 1

| | |
|---|---|
| Unmanned aerial vehicle (UAV) | 100, 200, 300, 400 |
| Vehicle body | 10 |
| Light transmission hole | 101, 101' |
| Fuselage | 11, 11', 11'', 11''' |
| Accommodating space | 110 |
| First accommodating space | 110a |
| Second accommodating space | 110b |
| First housing case | 111 |
| First main body | 1111 |
| First arm member | 1112 |
| Second housing case | 112 |
| Second main body | 1121 |
| Second arm member | 1122 |
| Landing gear | 12, 12', 12'', 12''' |
| First portion | 121 |
| Second portion | 122 |
| Connector | 13 |
| Rotor assembly | 14 |
| Motor | 141 |
| Multi-ocular imaging assembly | 20 |
| Imaging device | 21, 21', 21'', 21''' |
| Sensing head | 210 |
| Seat | 211 |
| Lens | 212 |
| Supporting frame | 22 |
| Frame | 221 |
| Assembly member | 2211 |
| Through-hole | 2211a |
| Arm portion | 222 |
| Mounting member | 2221 |
| Control circuit board | 23 |
| Flexible circuit board | 24 |
| Holder | 25 |
| Holder frame | 251 |
| Receiving cavity | 2511 |
| Opening | 2512 |
| Connecting member | 252 |
| Optical member | 253 |
| Fastener | 26 |
| Shock absorbing pad | 27 |
| Inertial measurement unit | 30 |
| Camera | 40 |
| Gimbal | 50 |

Illustrative embodiments will be described in more detail by reference to the drawings.

DETAILED DESCRIPTION OF THE DISCLOSURE

Figure 1:
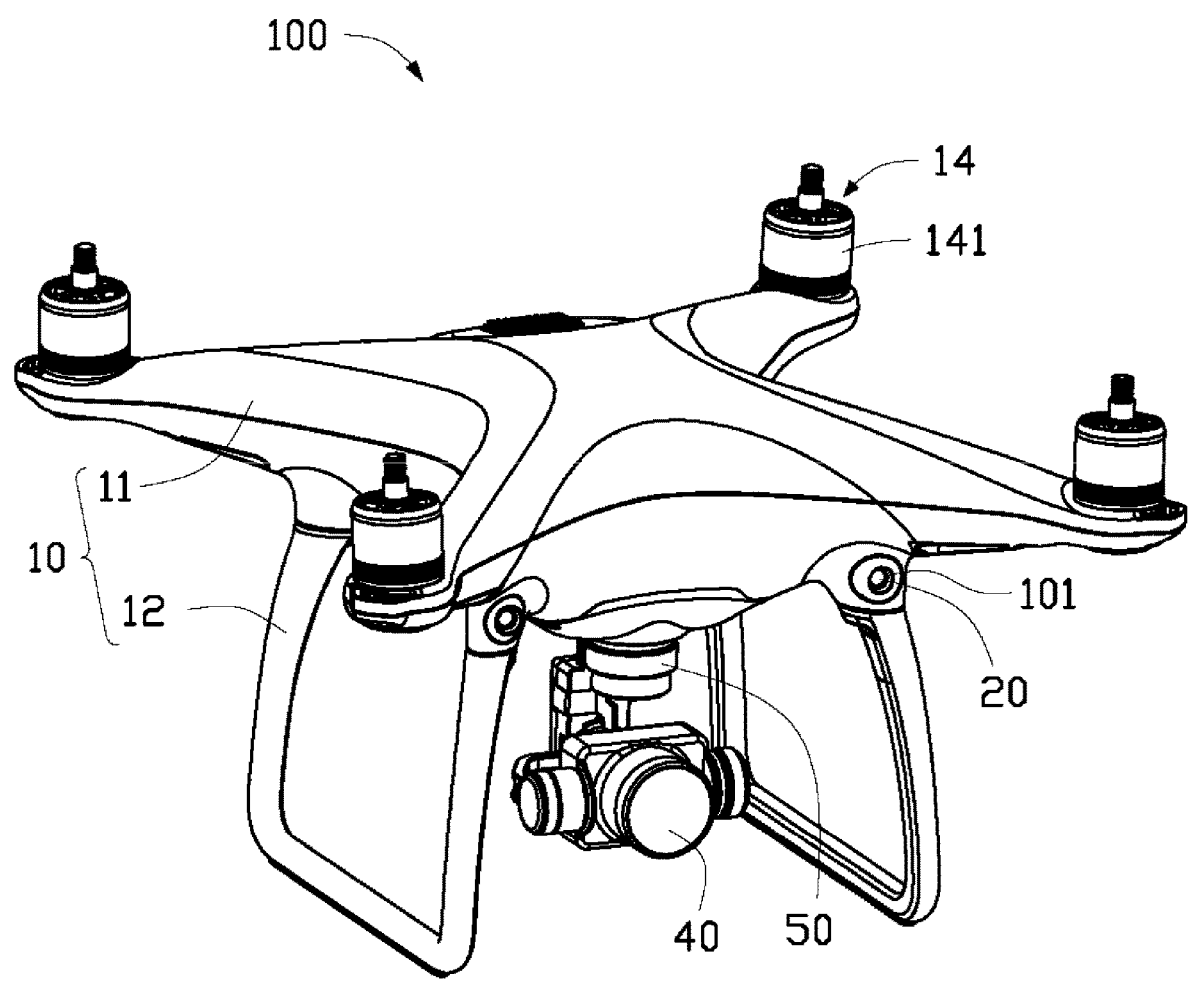
FIG. 1 shows a perspective view of an unmanned aerial vehicle (UAV) according to an embodiment of the disclosure.
Figure 2:
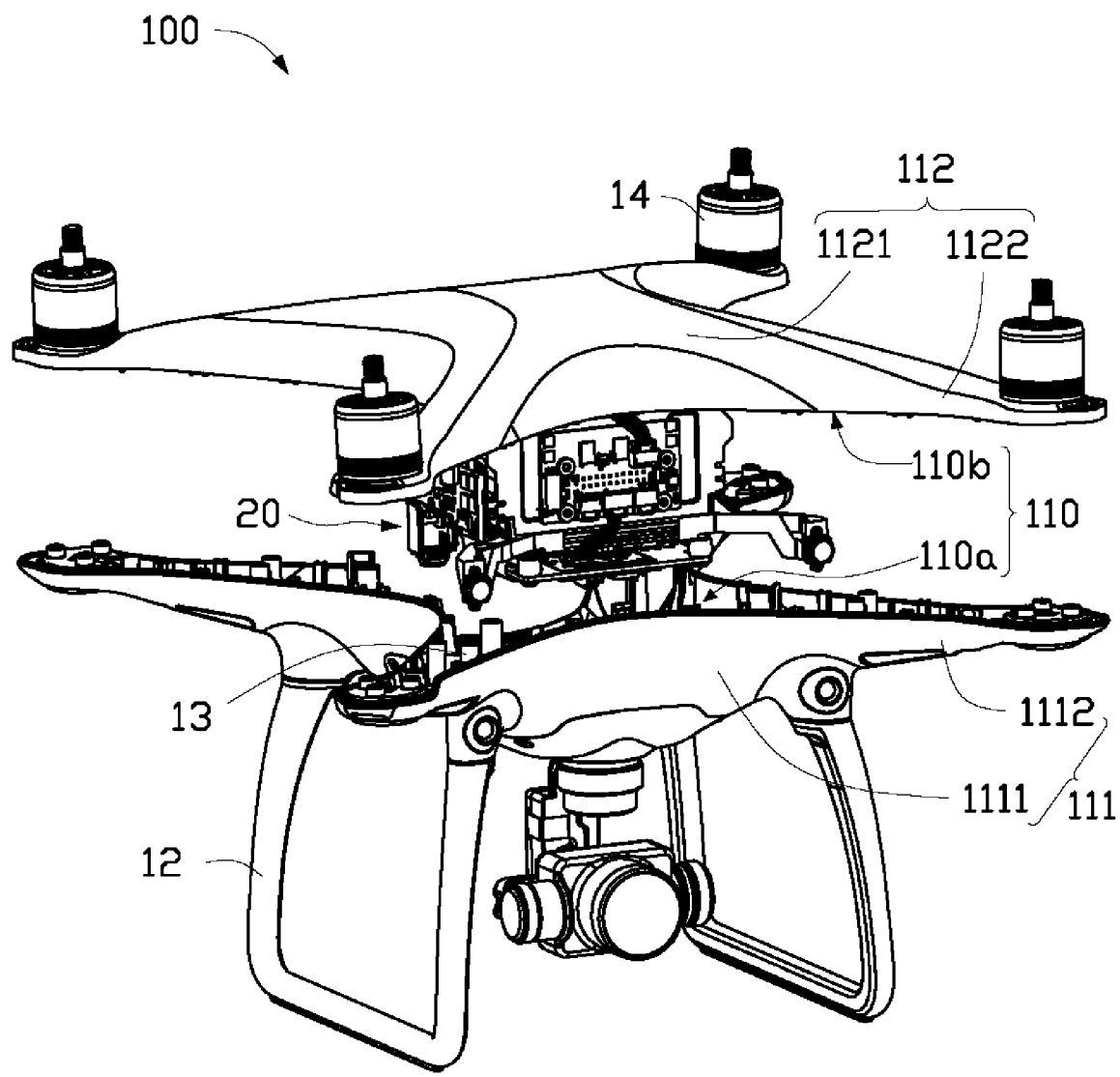
FIG. 2 shows a partial exploded view of the UAV of FIG. 1.

FIGS. 1 and 2 show an unmanned aerial vehicle (UAV) 100 according to an embodiment of the disclosure. The UAV 100 includes a vehicle body 10 and a multi-ocular imaging assembly 20. The multi-ocular imaging assembly 20 can be disposed within and fixed to the vehicle body 10.

In some embodiments, the UAV 100 can be a quad-rotor aerial vehicle (e.g., an aerial vehicle having four rotor assemblies 14). It will be appreciated that, the UAV 100 can be a multi-rotor aerial vehicle having six rotor assemblies, eight rotor assemblies, or twelve rotor assemblies. In some embodiments, the UAV 100 can be a single-rotor aerial vehicle. In some embodiments, the UAV 100 can be a fixed-wing aerial vehicle or an aerial vehicle having both fixed-wing and rotor. The rotor assembly 14 includes a motor 141 and a propeller (not shown) connected to the motor 14. Although not shown in the drawings, the propeller can be a compulsory part of the rotor assembly 14. The motor 141 can drive the propeller to rotate and hence provide a propulsion to the UAV 100.

The vehicle body 10 includes a fuselage 11 and a landing gear 12 connected to the fuselage 11. The fuselage 11 can serve as a supporting and receiving structure of the UAV 100. For example, the fuselage 11 can support the rotor assemblies 14, an antenna assembly (not shown), and a sensor (not shown). An accommodating space 110 can be formed within the fuselage 11 within which a circuit board (not shown), an inertial measurement unit (IMU) 30 (referring to FIG. 3), a flight controller (not shown), and a sensor (not shown) can be received. The fuselage 11 can have different shapes according to different designs on appearance of the UAV 100. For example, the fuselage 11 can have a regular square shape, a polygonal shape, a streamlined shape, or any regular or irregular shape.

In some embodiments, as shown in, e.g., FIG. 2, the fuselage 11 includes a first housing case 111 and a second housing case 112. The first housing case 111 can be snapped with the second housing case 112 to form the accommodating space 110. It will be appreciated that, the first housing case 111 can be connected to the second housing case 112 by other means including but not limited to screw connections.

The first housing case 111 includes a first main body 1111 and a plurality of first arm members 1112 extending from the first main body 1111. The first main body 1111 includes a recess that forms a first receiving space 100a. The number of the first arm members 1112 can correspond to the number of the rotor assemblies 14 of the UAV 100, such that the rotor assemblies 14 are supported at predetermined positions around the fuselage 11. In some embodiments, the first arm members 1112 can extend radially from the first main body 1111. For example, the plurality of first arm members 1112 can be provided symmetrically with respect to a center of the first main body 1111.

The second housing case 112 can have a substantially similar shape as that of the first housing case 111. The second housing case 112 includes a second main body 1121 and a plurality of second arm members 1122. The second main body 1121 includes a recess that forms a second receiving space 110b. After the first housing case 111 and the second housing case 112 are snapped together, the first receiving space 110a and the second receiving space 110b form the accommodating space 110, and a first arm members 1112 and a corresponding second arm member 1122 form a complete arm.

In some embodiments, as shown in, e.g., FIG. 2, the first housing case 111 includes a connector 13 and the second housing case 112 includes a mating connector (now shown) corresponding to the connector 13. The connector 13 can be connected to the corresponding mating connector when the first housing case 111 is snapped with the second housing case 112, such that a secure connection is provided between the first housing case 111 and the second housing case 112. In some embodiments, the connector 13 and the mating connector can effect a positioning, such that an accuracy in assembling the first housing case 111 with the second housing case 112 is increased. In some embodiments, the connector 13 can include a pillar, and the mating connector can include hole for receiving the pillar. In some embodiments, a plurality of connectors 13 can be provided. The number of the connectors 13 can vary according to need. It will be appreciated that, in some other embodiments, the connector 13 can be provided on the second housing case 112, and the mating connector can be provided on the first housing case. In some embodiments, some connectors 13 can be provided on the first housing case 111 and others can be provided on the second housing case 112, and accordingly, some mating connectors can be provided on the first housing case 111 and others can be provided on the second housing case 112.

In some embodiments, both the connector 13 can include a hollow pillar and the mating connector can include a pillar. The mating connector can be inserted into the connector 13 when the first housing case 111 and the second housing case 112 are connected with each other, such that the first housing case 111 is firmly fixed to the second housing case 112.

In some embodiments, the first housing case 111 can be integrally formed with the second housing case 112. An opening can be provided on the first housing case 111 and/or the second housing case 112, such that UAV components (for example, a circuit board, a supporting frames, a sensor, etc.) can be provided and installed within the accommodating space 110.

The landing gear 12 can provide support to the UAV 100 when landed. In some embodiments, the landing gear 12 can be fixed to the fuselage 11. In other embodiments, an angle between the landing gear 12 and the fuselage 11 can be changed. In still other embodiments, a connection angle between a first portion and a second portion of the landing gear 12 can be adjusted.

Figure 3:
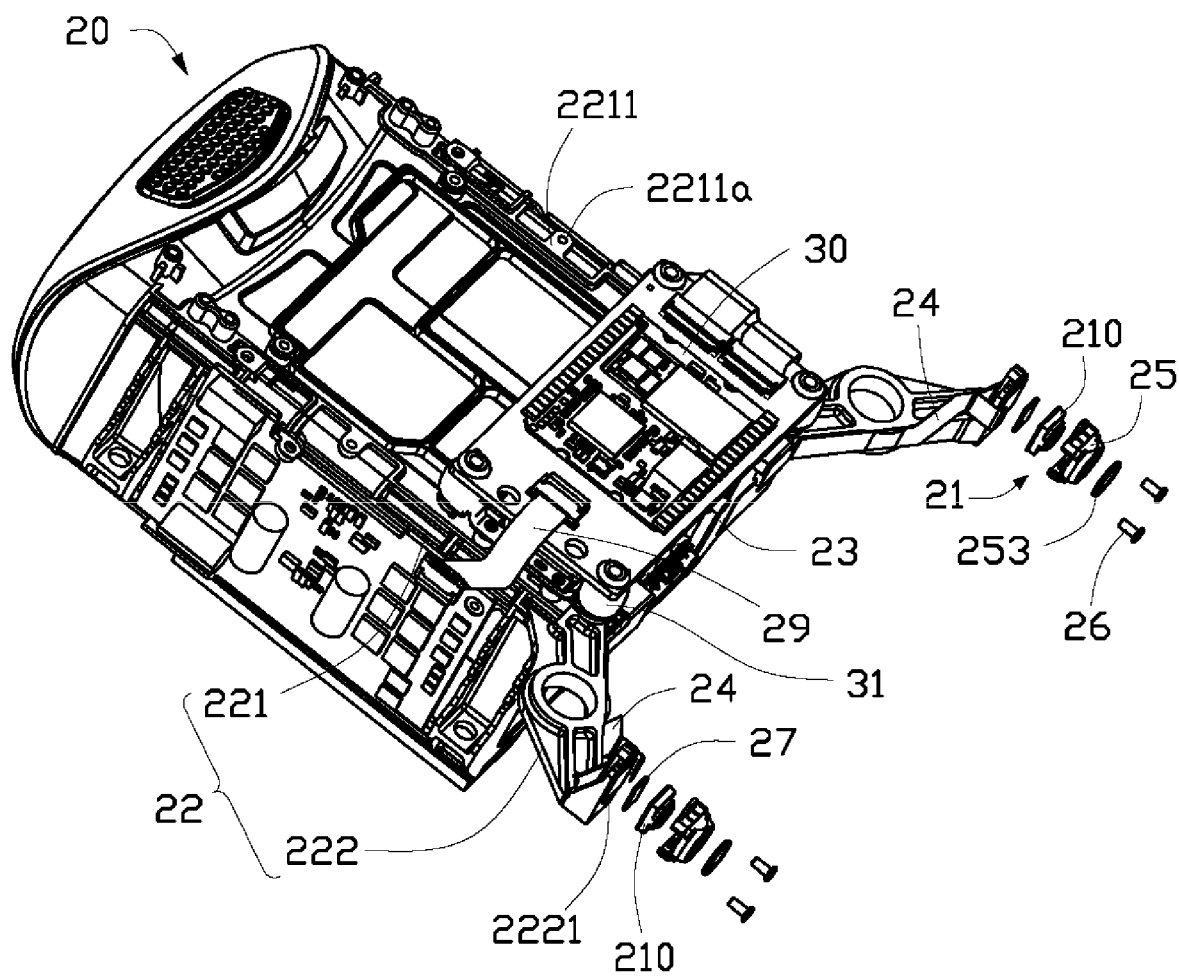
FIG. 3 shows a perspective view of a multi-ocular imaging assembly of the UAV of FIG. 2.
Figure 4:
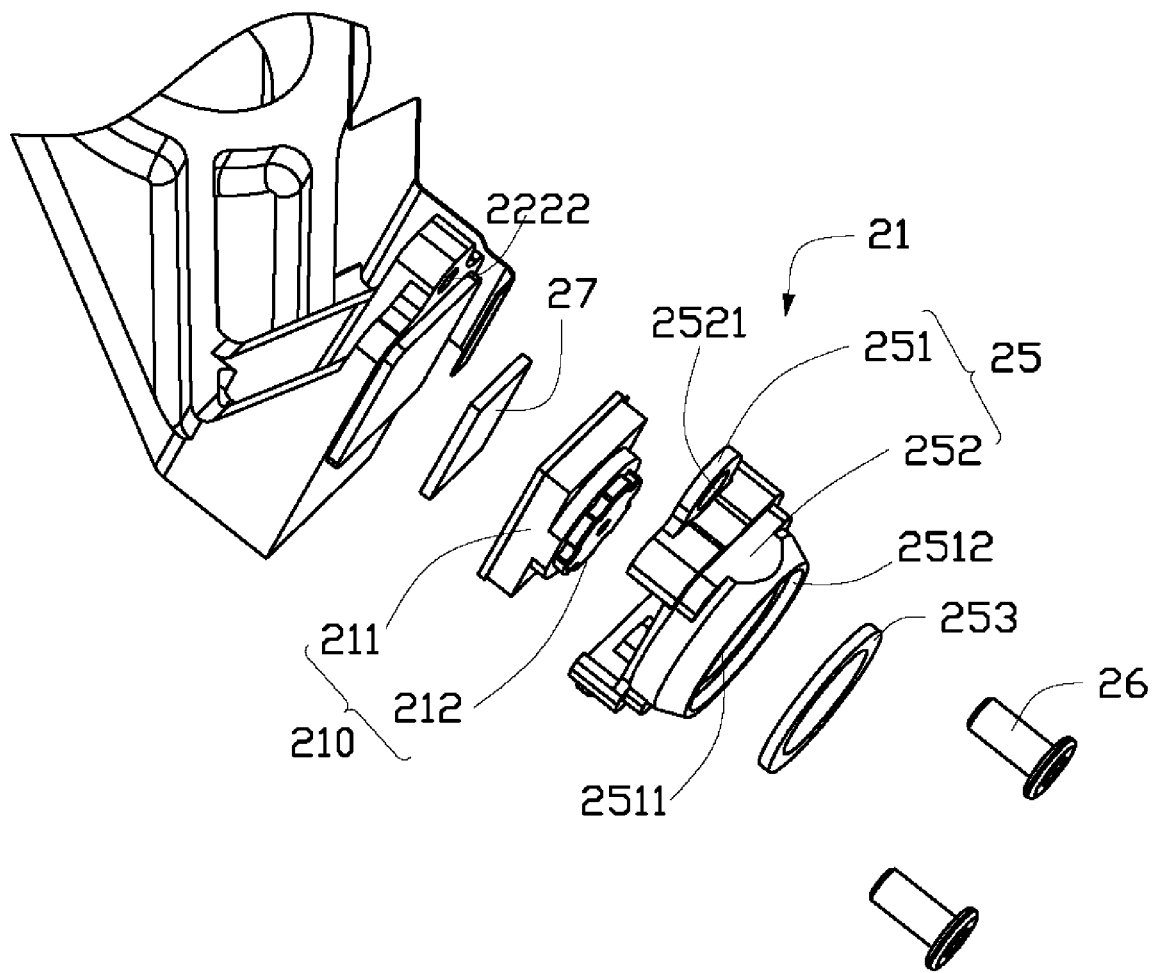
FIG. 4 shows a partial enlarged view of the multi-ocular imaging assembly of FIG. 3.

FIGS. 3 and 4 show details of the multi-ocular imaging assembly 20. Consistent with the disclosure, the multi-ocular imaging assembly 20 can sense the surrounding environment of the UAV 100 and measure an attitude of the UAV 100 to provide information and data in application such as obstacle avoidance, velocity measurement, positioning, and/or navigation of the UAV. In some embodiments, the multi-ocular imaging assembly 20 includes two imaging devices 21, a supporting frame 22, and a control circuit board 23. Two sensing heads 210 and the control circuit board 23 can be fixedly disposed on the supporting frame 22. The supporting frame 22 can be fixedly disposed within the vehicle body 10.

In some embodiments, two imaging devices 21 can be provided. It will be appreciated that, three, four, five, or even more imaging devices 21 can be provided according to different needs.

Each imaging device 21 includes a sensing head 210 and a holder 25. The holder 25 can firmly hold the corresponding sensing head 21 to the supporting frame 22.

Each sensing head 210 includes a seat 211 and a lens 212 connected to the seat 211. An imaging sensor (not shown) can be provided in the seat 211. The imaging sensor can sense a light and convert the light into an electric signal. The image sensor can include, but not limited to any one or combination of a charge-coupled device (CCD), a complementary metal-oxide-semiconductor (CMOS), or an N-type metal-oxide-semiconductor (NMOS). The lens 212 can capture an image of a target and project the image onto the image sensor. The lens 212 can include a digital SLR lens, a pinhole lens, a zoom lens, a prime lens, a fisheye lens, or a wide-angle lens.

In some embodiments, the sensing head 210 can provide various different functions in different application scenarios. For example, the sensing head 210 can record a temperature, generate multi-spectral images, detect an infrared, detect a Gamma ray, or detect a X-ray.

The holder 25 includes a holder frame 251 and a connecting member 252 connected to the holder frame 251. The holder frame 251 includes a receiving cavity 2511 for receiving the sensing head 210 therein. In some embodiments, the receiving cavity 2511 can be shaped and sized to match the sensing head 210, such that the sensing head 210 does not vibrate relative to the holder frame 251 when it is received in the receiving cavity 2511. An opening 2512 can be provided at a side of the holder 25 opposite to the sensing head 210. The opening 2512 can be in communication with the receiving cavity 2511 and allow light to reach the sensing head 210.

The holder frame 251 can be fixed to the supporting frame 22 by the connecting member 252. In some embodiments, the connecting member 252 includes two tabs extending from a circumference of the holder frames 251, each including a through-hole 2521. In some embodiments, the holder 25 can be fixed to the supporting frame 22 by fasteners 26 passing through the through-holes 2521.

In some other embodiments, the holder 25 can be fixed to the supporting frame 22 by a snap fit, a glue, or welding, in which cases the connecting member 252 and the fasteners 26 can be omitted.

In some embodiments, the imaging device 21 includes an optical member 253 provided at the opening 2512 of the holder frame 251. The optical member 253 can enclose the opening 2512. The optical member 253 can prevent the sensing head 210 from contamination such as by dust or water vapor. In some other embodiments, the optical member 253 can provide a filtering function. For example, the optical member 253 can include an infrared filter or a UV filter. In some embodiments, the optical member 253 can have a planar, spherical, or aspherical shape.

In some embodiments, a shock absorbing pad 27 is provided between each imaging device 21 and the supporting frame 22. In some embodiments, the shock absorbing pad 27 is disposed between the sensing head 210 and the supporting frame 22. The shock absorbing pad 27 can mitigate or eliminate a vibration that may be experienced by the sensing head 210, such that accuracy and reliability of data obtained by the sensing head 210 are increased. The shock absorbing pad 27 can be made of a material having an elasticity, such as foam, sponge, rubber, or silicone.

The supporting frame 22 includes a frame portion 221 and arm portions 222 fixed to the frame portion 221. In some embodiments, the frame portion 221 can be have a substantially polyhedral shape. Functional modules, such as the IMU 30, the control circuit board 23, a power board (not shown), an image processor (not shown), an image transmitter (not shown) or a flight controller (not shown) can be provided at different sides of the frame portion 221. The various functional modules can be connected to each other through a flexible flat cable 29 to enable data and signals exchanging and/or data fusion. The frame portion 221 can be provided as a substantially polyhedral frame, such that various functional modules can be disposed on the frame portion 221 to minimize size and facilitate heat dissipation. In addition, since the frame portion 221 is shaped as a substantially polyhedral frame, various functional modules can be installed on different surfaces of the frame portion 221 before the frame portion 221 is provided into an interior of the vehicle body 10. Therefore, an efficiency in mounting the functional modules can be improved since the functional modules are not mounted within a relative small interior space of the vehicle body 10. In addition, an accuracy in mounting the functional modules can be improved since the functional modules are not mounted within a relative small interior space of the vehicle body 10.

In some embodiments, a damper 31 can be provided between the IMU 30 and the supporting frame 22. The damper 31 can mitigate or eliminate a vibration transmitted from the vehicle body 10 to the IMU 30, such that accuracy and reliability of data obtained by the IMU 30 are improved.

In some embodiments, the damper 31 can include damping balls. The damping balls can be made of rubber or silicone.

In some embodiments, the frame portion 221 includes an assembly member 2211. The frame portion 221 can be fixe to the vehicle body 10 by the assembly member 2211. In some embodiments, the assembly member 2211 includes a through-hole 2211a. The frame portion 221 can be fixed to the vehicle body 10 via a fastener (not shown) passing through the through-holes 2211a. In some other embodiments, the frame portion 221 can be fixed to the vehicle body 10 by a snap fit, a glue, or welding.

The arm portions 222 can extend from the frame portion 221 for a predetermined distance, such that the imaging devices 21 are supported at predetermined positions. A mounting member 2221 is formed at a distal end of each arm portion 222. A side of the mounting member 2221 that is distal from the arm portion 222 can be planar, such that the imaging device 21 can abut against the mounting member 2221. In some embodiments, the mounting member 2221 can be provided protruding from the distal end of the arm portion 222. In some other embodiments, the mounting member 2221 can be provided denting into the end of the arm portion 222. In some other embodiments, the mounting member 2221 can be omitted and the imaging device 21 can directly abut against the distal end of the arm portion 222. In some embodiments, the shock absorbing pad 27 can be disposed between the sensing head 210 and the arm portion 222 to mitigate a vibration that may be experienced by the sensing head 210.

In some embodiments, the distal end of the arm portion 222 includes a mounting hole 2222 which corresponds to the through-hole 2521. The mounting hole 2222 can be a threaded hole. The holder 25 is fixed to the arm portion 222 by a fastener 26. The fastener 26 can pass through the through-hole 2521 and can be threadedly connected into the mounting hole 2222.

In some embodiments, the distal end of the arm portion 222 includes a mounting hole 2222, which corresponds to the through-hole 2521. The mounting hole 2222 can be a threaded hole. The holder 25 can be fixed to the arm portion 222 by a fastener 26. In some embodiments, the fastener 26 can be a bolt. The fastener 26 can pass through the through-hole 2521 and can be threadedly connected into the mounting hole 2222.

A line connecting centers of the two imaging devices 21 of the multi-ocular imaging assembly 20 is referred to as a baseline. Targets at various distances can be sensed using various baseline lengths. For example, a longer baseline length can be appropriate for sensing a target at a longer distance. Otherwise, the multi-ocular imaging assembly 20 may function merely like a monocular imaging assembly and hence cannot obtain depth information of the target. Thus, a smaller baseline length can be appropriate for sensing a target at a shorter distance. In some embodiments, the baseline length can range from 11 cm to 15 cm. In some embodiments, the baseline length can be 13 cm. The multi-ocular imaging assembly 20 having a baseline length of 13 cm can be widely adaptable to obtain depth information of targets positioned in a wide range of distances.

The arm portions 222 can be rotatably connected to the frame portion 221 to enable an adjustment of a distance between distal ends of the arm portions 222, such that the baseline of the multi-ocular imaging assembly 20 can be adjustable. In some embodiments, the arm portions 222 can be locked with respect to the frame portion 221 after the arm portions 222 are rotated by a predetermined angle, such that a relative movement of the multi-ocular imaging assembly 20 with respect to the vehicle body 10 is prevented to thereby increase accuracy and reliability of data obtained by the multi-ocular imaging assembly 20. The predetermined angle can be, for example, 1°, 2°, 3°, 5°, 10°, 20°, 30°, 45°, or 60°.

In some embodiments, the mounting member 2221 can be integrally formed with the arm portions 222. In some embodiments, the mounting member 2221 can be separately formed and then mounted at the distal end of the arm portion 222.

The control circuit board 23 can be electrically connected to the imaging devices 21 for processing data obtained by the imaging devices 21 and implementing data exchange or date fusion with data obtained from another functional module. In some embodiments, the control circuit board 23 can be electrically connected to the sensing heads 210 via flexible circuit boards 24 which respectively extend to the corresponding sensing heads 210 along the corresponding arm portions 222.

In some embodiments, the vehicle body 10 includes light transmission holes 101 which correspond to the imaging devices 21 of the multi-ocular imaging assembly 20. Upon assembling, the imaging device 21 can be aligned with the light transmission hole 101 which allows light to pass through and reach the imaging device 21. The light transmission holes 101 can be provided on the fuselage 11. In some embodiments, the light transmission holes 101 can be provided in adjacent to the landing gears 12, such that an influence on the multi-ocular imaging assembly 20 from vibration of the rotor assemblies 14 can be reduced to be within an acceptable range. By disposing the imaging devices 21 on the fuselage 11 at positions adjacent to the landing gears 12 and remote from the rotor assemblies 14, a vibration experienced by the imaging devices 21 that originates from rotation of the rotor assemblies 14 can be reduced. In addition, propellers of the rotor assemblies 14 can be avoided from being captured by the imaging devices 21.

In some embodiments, the multi-ocular imaging assembly 20 can comprise an image processor (not shown) for processing images obtained by the imaging devices 21. In some embodiments, the image processor can synthesize images/videos obtained from the imaging devices 21 into an image/video having depth information based upon the baseline length between the imaging devices 21, and the distance of the target. In some embodiments, the image processor can be provided on the control circuit board 23.

Referring again to FIGS. 1 and 2, in some embodiments, the UAV 100 includes a camera 40 and a gimbal 50 which connects the camera 40 to the vehicle body 10. The camera 40 can capture two-dimensional images. The gimbal 50 can change an orientation of the camera 40 and provide stability to the camera 40. In some embodiments, the gimbal 50 can be a three-axis gimbal capable of changing an orientation of the camera 40 about a roll axis, a pitch axis, and a yaw axis.

Figure 5:
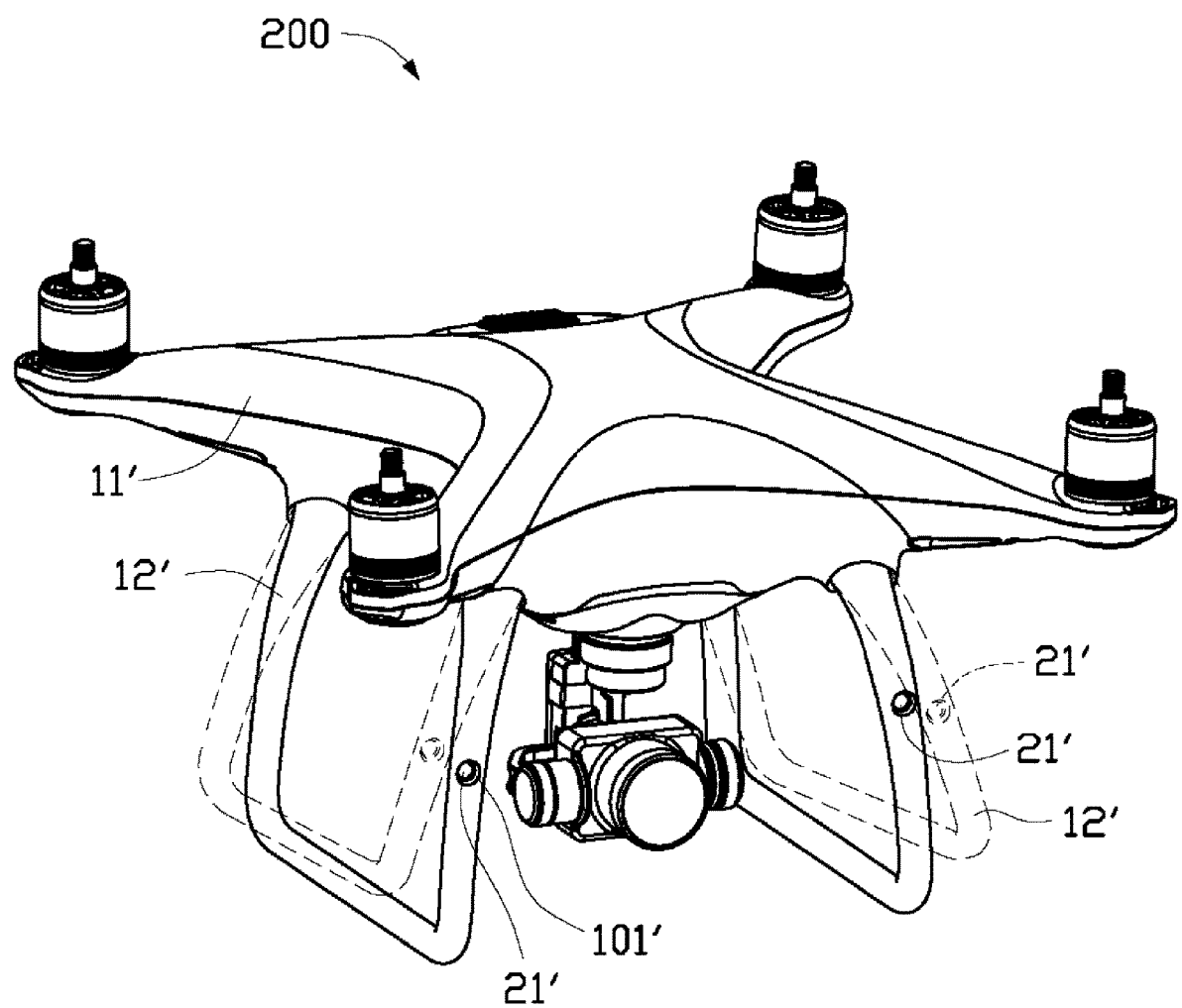
FIG. 5 shows a schematic diagram of an UAV according to another embodiment of the disclosure.

FIG. 5 is a schematic diagram of a UAV 200 according to another embodiment of the disclosure. As shown in FIG. 5, imaging devices 21' of the UAV 200 are fixedly disposed at landing gears 12'. Accordingly, light transmission holes 101', each of which corresponds to a corresponding imaging device 21', can be provided on the landing gears 12'. The landing gears 12' can be rotatably connected to a fuselage 11'. A distance between the imaging devices 21' can be changed by rotating the landing gears 12' with respect to the fuselage 11', such that a baseline length between the imaging devices 21' is adjusted. The baseline length of the UAV 200 can be adaptively adjusted based upon a distance of the target, such that the multi-ocular imaging assembly can be adapted to provide an accurate and reliable measurement of targets at different distances. For example, the landing gears 12' can be lowered when the UAV 200 takes off or flies at a lower altitude, in which circumstance the distance between the imaging devices 21' is shorter (in other words, the baseline length of the multi-ocular imaging assembly is shorter), making it suitable for measuring proximal objects. The landing gears 12' can be raised when the UAV 200 flies at a higher altitude, in which circumstance the distance between the imaging devices 21' becomes larger (in other words, the baseline length of the multi-ocular imaging assembly becomes longer), making it suitable for measuring distal objects.

A plurality of technical advantages can be achieved by disposing the imaging devices 21' at the landing gears 12'. For example, the imaging devices 21' can have a larger degree of freedom and a wider Field of View (FOV) in image capturing. The imaging devices 21' can be prevented from being blocked by other components of the UAV 200. For another example, an orientation of the landing gears 12' with respect to the fuselage 11' can be adjusted since the landing gears 12' of the UAV 200 are flexible to rotate. Therefore, the baseline length of the multi-ocular imaging assembly can be adjusted based upon a distance of the target and a flight altitude of the UAV 200.

Figure 6:
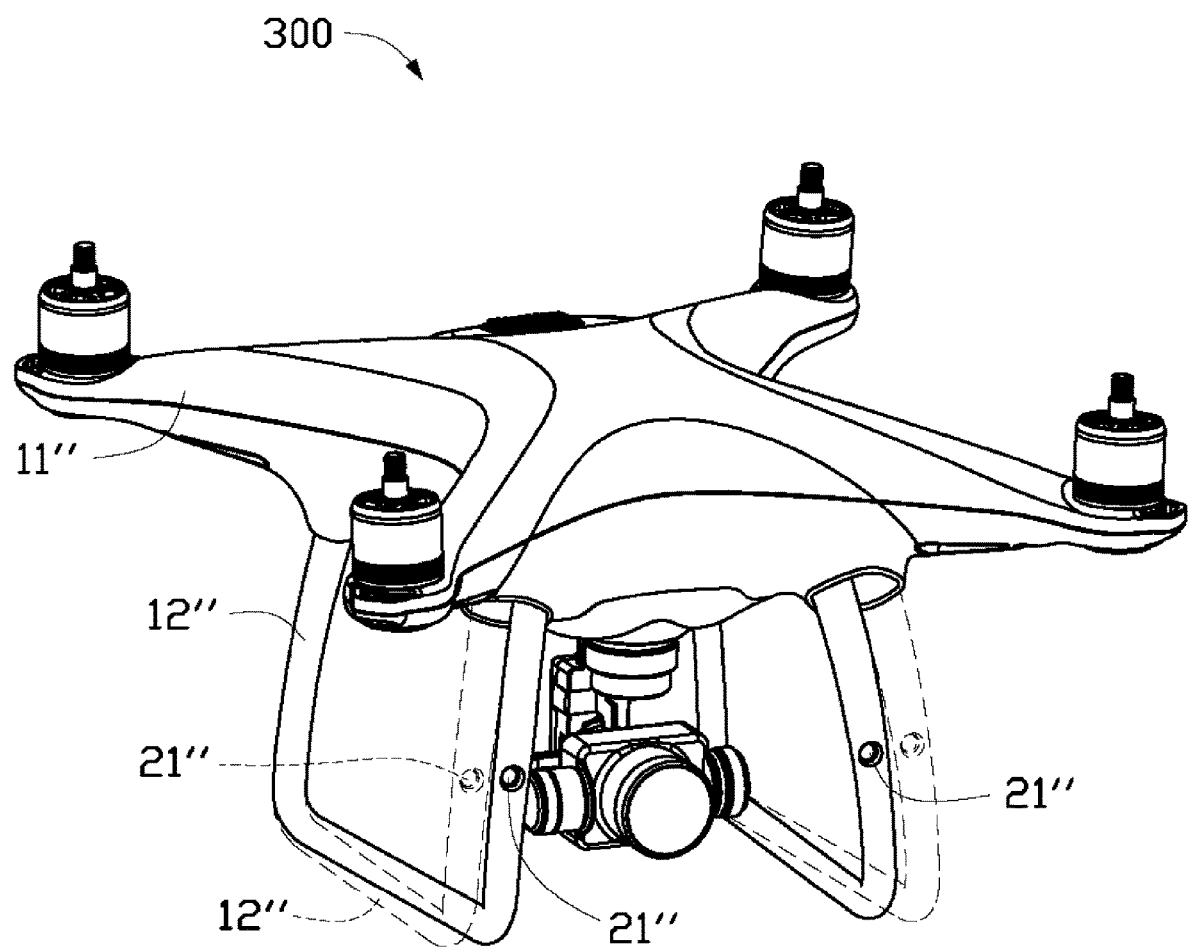
FIG. 6 shows a schematic diagram of an UAV according to another embodiment of the disclosure.

FIG. 6 is a schematic diagram of a UAV 300 according to another embodiment of the disclosure. As shown in FIG. 6, the landing gears 12" can be rotated with respect to a fuselage 11" about different axes. A distance between imaging devices 21" can be adjusted by a rotation of the landing gears 12" with respect to the fuselage 11". In other words, the baseline length between the imaging devices 21" can be adjusted. The baseline length of the UAV 300 can be adaptively adjusted based upon a distance of the target, such that the multi-ocular imaging assembly can be adapted to provide an accurate and reliable measurement of targets at different distances.

Figure 7:
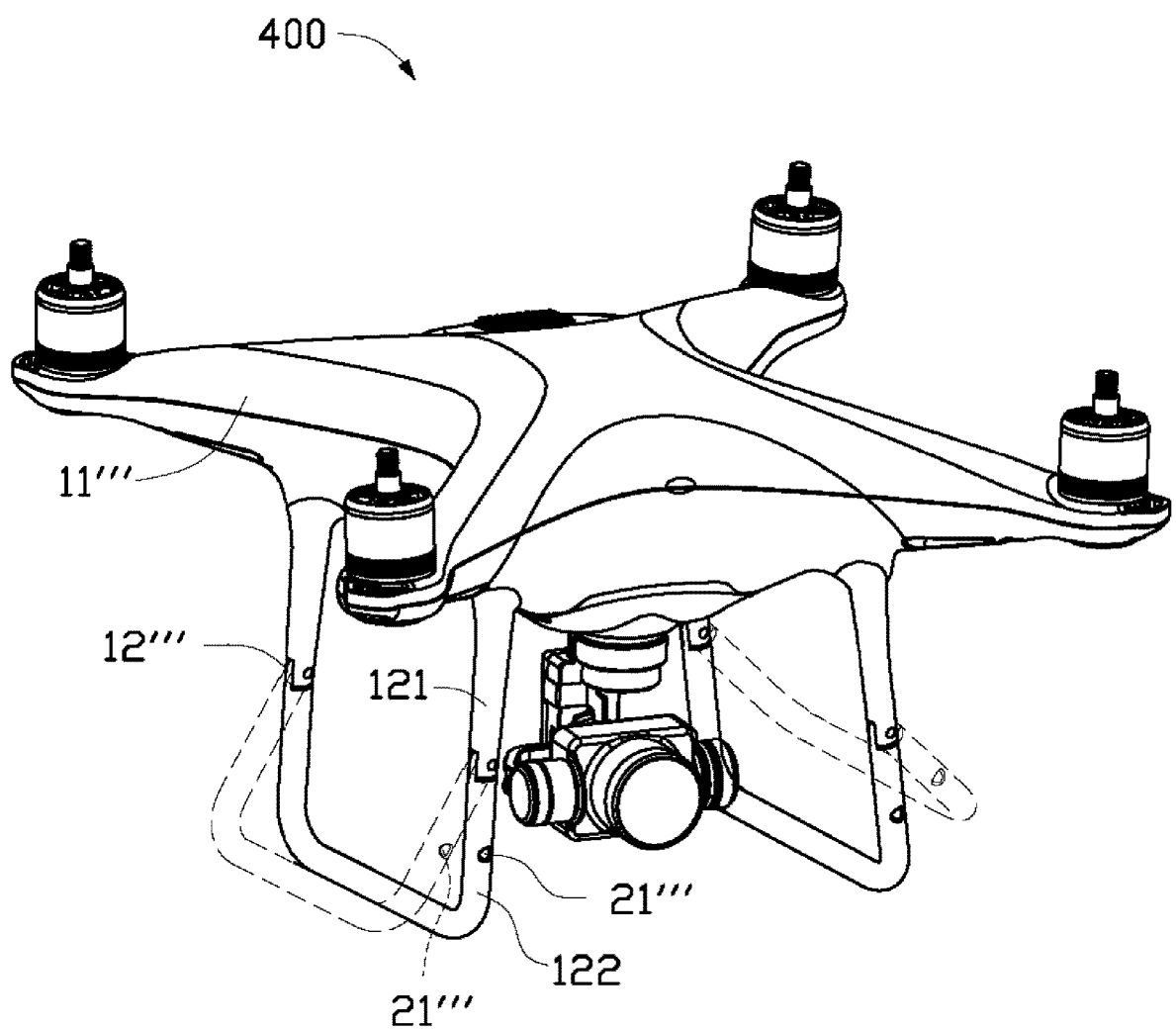
FIG. 7 shows a schematic diagram of an UAV according to another embodiment of the disclosure

FIG. 7 is a schematic diagram of a UAV 400 according to another embodiment of the disclosure. As shown in FIG. 7, each of landing gears 12''' includes a first portion 121 and a second portion 122 rotatably connected to the first portion 121. The first portions 121 can be fixed to a fuselage 11'''. Imaging devices 21''' are fixedly provided at the second portions 122. Correspondingly, light transmission holes 101''', each of which corresponds to a corresponding imaging device 21''', are provided at the landing gears 12'''. A distance between the imaging devices 21''' can be changed by rotating the second portions 122 of the landing gears 12''' with respect to the fuselage 11''', such that a baseline length between the imaging devices 21''' can be adjusted. The baseline length of the UAV 400 can be adaptively adjusted based upon a distance of the target, such that the multi-ocular imaging assembly can be adapted to provide an accurate and reliable measurement of targets at different distances.

A displacement of the multi-ocular imaging assembly relative to the vehicle body can be avoided during its operation by disposing the multi-ocular imaging assembly within the vehicle body of the UAV. Therefore, a degradation in measurement accuracy and reliability due to a displacement of the multi-ocular imaging assembly relative to the vehicle body of the UAV can be prevented, such that higher measurement accuracy and reliability are achieved.

The present disclosure also provides a multi-ocular imaging system including a movable object and the multi-ocular imaging assembly 20 provided at the movable object. The multi-ocular imaging assembly 20 can be fixedly connected to the vehicle body of the movable object. The vehicle body can also be referred to as a housing or a casing. The movable object to which the multi-ocular imaging assembly 20 is provided can include, for example, an unmanned vehicle or an unmanned watercraft, such as an unmanned aerial vehicle.

It will be appreciated that, numerous variations and substitutions will occur to those skilled in the art without departing from the scope of the disclosure. Those variations and substitutions made in accordance with the spirit of the disclosure are within the scope of the present disclosure.

What is claimed is:

1. An unmanned aerial vehicle (UAV), comprising:
   a vehicle body including a fuselage and a landing gear rotatably connected to the fuselage; and
   a multi-ocular imaging assembly including at least two imaging devices fixed to the landing gear, the at least two imaging devices being connected to the fuselage through the landing gear;
   wherein the landing gear is configured to be rotated relative to the fuselage to adjust a distance between the imaging devices.

2. The UAV of claim 1, wherein: the landing gear includes a first portion connected to the fuselage and a second portion rotatably connected to the first portion; the imaging devices are fixedly disposed in the second portion; and the second portion is configured to be rotated relative to the first portion to adjust a distance between the imaging devices.

3. The UAV of claim 1, wherein the multi-ocular imaging assembly further includes a supporting frame, the multi-ocular imaging assembly being fixedly disposed in the vehicle body via the supporting frame.

4. The UAV of claim 3, wherein:
   the supporting frame includes a frame portion and arm portions connected to the frame portion;
   the imaging devices are fixedly disposed on the arm portions; and
   the multi-ocular imaging assembly further includes a control circuit board electrically connected to the imaging devices and fixedly disposed on the frame portion.

5. The UAV of claim 4, wherein:
   the frame portion has a substantially polyhedral shape; and
   the control circuit board is disposed on a surface of the frame portion.

6. The UAV of claim 5,
   wherein the surface is a first surface of the frame portion;
   the UAV further comprising:
   an inertial measurement unit (IMU) disposed on a second surface of the frame portion.

7. The UAV of claim 6, further comprising:
   a damper between the IMU and the frame portion.

8. The UAV of claim 7, wherein the damper includes elastic damping balls.

9. The UAV of claim 5, wherein the control circuit board is electrically connected to the IMU.

10. The UAV of claim 4, wherein each one arm portion of the arm portions extends from the frame portion by a predetermined distance and includes a mounting member formed at a distal end of the one arm portion and against which one of the imaging devices abuts.

11. The UAV of claim 10, wherein:
    a side of the mounting member opposite to the one arm portion is planar; and/or
    the mounting member protrudes from the distal end of the one arm portion.

12. The UAV of claim 4, wherein the arm portions are rotatably connected to the frame portion and are stationary with respect to the frame portion after the arm portions rotate relative to the frame portion by a predetermined angle.

13. The UAV of claim 4, further comprising:
    a shock absorbing pad between each of the imaging devices and the corresponding arm portion.

14. The UAV of claim 13, wherein the shock absorbing pad is made of at least one of a foam, a sponge, a rubber, or a silicone.

15. The UAV of claim 4, wherein the control circuit board is electrically connected to each one imaging device of the imaging devices through a flexible circuit board extending to the one imaging device along the corresponding arm portion.

16. The UAV of claim 4, wherein each of the imaging devices includes a sensing head and a holder holding the sensing head to the supporting frame.

17. The UAV of claim 16, wherein the holder includes:
    a holder frame receiving and holding the sensing head; and
    a connecting member connected to the holder frame and fixed to the arm portion.

18. The UAV of claim 17, wherein
    the holder frame includes a receiving cavity receiving the sensing head;
    the holder includes an opening at a side of the holder opposite to the sensing head, the opening being in communication with the receiving cavity and allowing light to reach the sensing head; and
    the holder further includes an optical member enclosing the opening.

19. The UAV of claim 1, wherein the fuselage includes a first housing case and a second housing case, the first housing case being snapped with the second housing case to form an accommodating space, and
    wherein light transmission holes are provided on the landing gear corresponding to the imaging devices.

* * * * *